United States Patent [19]

Rempel

[11] 4,089,569

[45] May 16, 1978

[54] RESILIENT MOUNT FOR THE DRIVING SHAFT OF AN IMPACT MATRIX PRINTER AND THE LIKE

[75] Inventor: William D. Rempel, Howell, Mich.

[73] Assignee: Sycor, Inc., Ann Arbor, Mich.

[21] Appl. No.: 659,242

[22] Filed: Feb. 19, 1976

[51] Int. Cl.² .................... F16C 1/00; F16C 27/06
[52] U.S. Cl. .................. 308/184 R; 400/124; 308/26; 308/190; 101/401.5; 400/354.1
[58] Field of Search ............... 308/184 R, 184 A, 9, 308/122, 26, 173, 189 R, 190; 197/1 R, DIG. 1; 101/401.5

[56] References Cited

U.S. PATENT DOCUMENTS 3,813,826  6/1974  Bando .................. 308/184
3,954,309  5/1976  Hutson et al. ............ 308/184

Primary Examiner—Richard A. Bertsch
Attorney, Agent, or Firm—Price, Heneveld, Huizenga & Cooper

[57] ABSTRACT

A resilient suspension mount for the ends of a lead screw drive shaft, including a bearing housing and a cover plate secured to a shaft support member by a plurality of fasteners. The end of the lead screw is disposed within a bearing. The bearing is flexibly supported within the bearing housing to permit radial displacements of the shaft and its bearing under load, during drive operation. Provision is also made to permit longitudinal movement of the shaft and accompanying lateral movement of the bearing and its housing, to accommodate thermal expansion of the shaft.

15 Claims, 2 Drawing Figures

RESILIENT MOUNT FOR THE DRIVING SHAFT OF AN IMPACT MATRIX PRINTER AND THE LIKE

BACKGROUND OF THE INVENTION

This invention relates to printers employing a movable carriage and more particularly it concerns a resilient mounting arrangement for a lead screw or other such rotary drive shaft, particularly as used in a carriage drive system.

Matrix printers of the type having a movable, carriage-supported, multiple solenoid-type print head are known in the prior art. The carriage and print head are combined with a conventional platen, paper advance and a logically controlled actuation system to permit matrix printing, which may be done in both a forward and reverse direction. Such printers are commonly employed as readout terminals for digital computer systems.

Conflicting requirements are encountered in the selection and in the design of a data printer. In the environment of a computer system, the speed at which information can be obtained is generally limited by the speed of the printer employed as an output terminal. However, as more sophisticated drive systems are employed to increase the output of the printer, the cost to manufacture and purchase such a printer also drastically increases. In an attempt to maintain an adequate print rate while maintaining the costs of manufacture and therefore the price of the printer within a reasonable range, impact matrix printers had been proposed which employ a lead screw drive shaft upon which the print head carriage is threadably disposed. In such an arrangement, a pair of supporting end plates or like members are provided. A guide or slider rod and the lead screw shaft extend longitudinally between the end plates. The carriage structure includes slide bearings for slidably securing the carriage to the guide rod. The support end plates and guide rod must provide a rigid support system so that a fixed, predetermined distance and position relationship is always maintained between the print heads and the platen during operation of the high speed printer, since this is essential to maintain printing operation of the device.

Certain problems are encountered, however, with such a drive train and support structure due to the fact that the screw shaft is constantly being abruptly started and stopped, rotating and reversing its direction of rotation, at a rapid rate. The lead screw is thus subjected to alternating torsional stresses and it is also under axial loading due to the alternating motion of the carriage and print head structure. Further, due to variances in manufacturing tolerances in units of commercial quality the lead screw is likely to be bowed or irregularly non linear in shape, in varying degrees, and may be further distorted by stresses incurred during operation. Also, during operation of the screw shaft drive system, the lead screw, being by nature a mechanism of limited mechanical efficiency, is subject to heating, causing thermal expansion. As a result, the lead screw tends to bind after a period of initial use, further aggravating the above-noted problems. In fact, the lead screw may jam, and the internally threaded follower portions of the carriage which ride on the screw shaft may become jammed, or damaged, thereby severely impairing the overall operation of the printer and perhaps causing malfunction.

SUMMARY OF THE INVENTION

In accordance with the present invention, an improved lead screw drive for a printer is provided including a mounting arrangement which is mechanically simple, results in smooth operation of the screw shaft drive system, possesses a relatively long life and is capable of low cost manufacture. Essentially, the screw shaft drive system of the present invention includes a pair of spaced end support plates, between which are secured guide rods, and to which is rotatably mounted a lead screw drive shaft. The mounting for the lead screw includes a bearing housing having a hub portion defining a journal bearing support chamber and a mounting flange portion. Each end of the lead screw is provided with a roller or ball-type bearing with the inner race of the bearing structure fitted onto the lead screw. The bearing is supported within the bearing housing by resilient annular members, preferably O-rings. A bearing retainer plate abuts the flanged portion of the bearing housing and serves both to retain the bearing within the housing, and to initially deform the O-rings, thus preloading them. A plurality of fasteners extend through the cover plate, the flange portion of the housing of the side support plates to secure the mounting structure within an aperture formed in the support plates. A rubber grommet is sandwiched between one end of each fastener and the cover plate.

The O-rings supporting the bearing provide a flexible mounting arrangement for the screw shaft, allowing the ends a limited amount of radial movement and thereby eliminating binding during operation. This is controlled by the amount of void space left inside the housing. If this space was not accurately controlled the bearing would either have no radial play at all or would be able to back away from the gear while operating. The rubber grommets permit longitudinal motion of the mounting arrangement accompanying lengthwise creep or extension of the shaft, to thereby accommodate axial thermal expansion of the lead screw drive.

DETAILED DESCRIPTION OF THE PREFERRED EMBODIMENT

Figure 1:
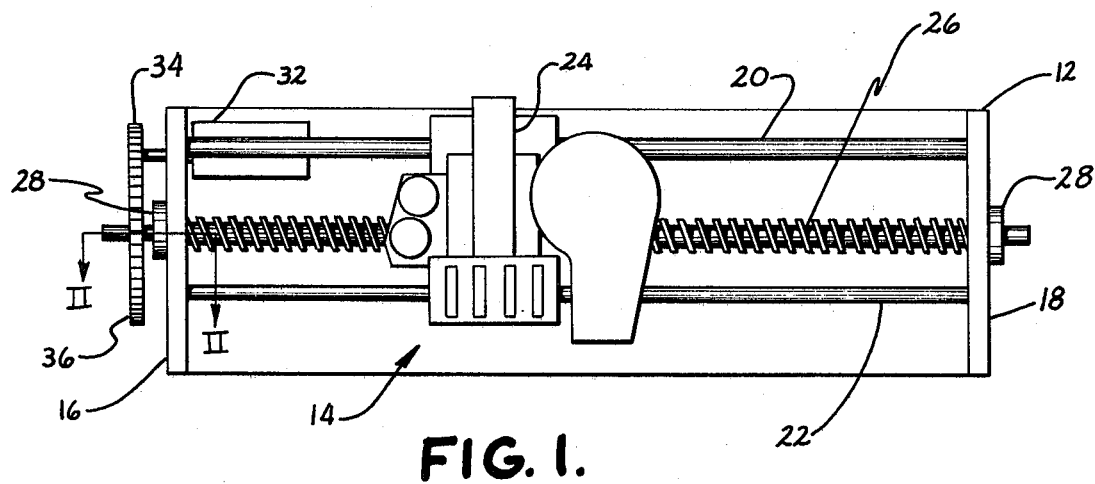
FIG. 1 is a plan view of a portion of a printer including a lead screw mount in accordance with the present invention.

With reference to the drawings, FIG. 1 illustrates in simplified form a portion of a typical printer carriage mount and drive arrangement, generally designated by the reference number 10. As shown, a supportive frame 12 is provided including an elongated base 14 and upstanding support plates or other end members 16 and 18. An upper guide rod 20 and a lower guide rod 22 extend longitudinally between the upstanding support plates 16 and 18, tying the same together structurally. The guide rods extend parallel and in a spaced relationship to each other. A carriage 24 adapted to support a print head (not shown) is slidably carried by the guides 20 and 22. The carriage is therefore supported for guided lateral movement in either longitudinal direction along the guide rods 20, 22 which also prevent transverse movement, or shifting of the carriage alignment relative to the platen, and the printer generally.

A longitudinally extending screw shaft or lead screw 26 is disposed in a spaced, parallel relationship to each of the guide rods 20 and 22 between the upstanding support ends 16 and 18 of the support 12. End shaft mounts 28 rotatably support at least one of the ends of the screw shaft 26, and if desired, both such ends, within apertures 30 (see FIG. 2) formed in the upstanding support ends or legs 16 of the support 12. A reversible electric motor 32 drives the screw shaft 26 through a pinion gear 34 and a driven gear 36 non-rotatably secured to one end of the lead screw. As will be understood. The carriage 24 includes a threaded follower (not shown) operatively engaged by the screw shaft 26, by which the rotary movements of the shaft are translated into linear movement of the carriage along the shaft.

During the operation of the overall printer of which the structure shown in FIG. 1 forms a portion, the printer control and logic system actuates the electric motor 32 to rotate the lead screw 26 in alternating directions, thereby moving the carriage 24 either to the right or to the left at a relatively high speed. This permits characters to be imprinted on a sheet (not shown) by print hammers or needles (also not shown) carried by the carriage 24 along a platen disposed close to the path of movement of the carriage 24 as the latter is driven in either direction (all in a known manner).

Figure 2:
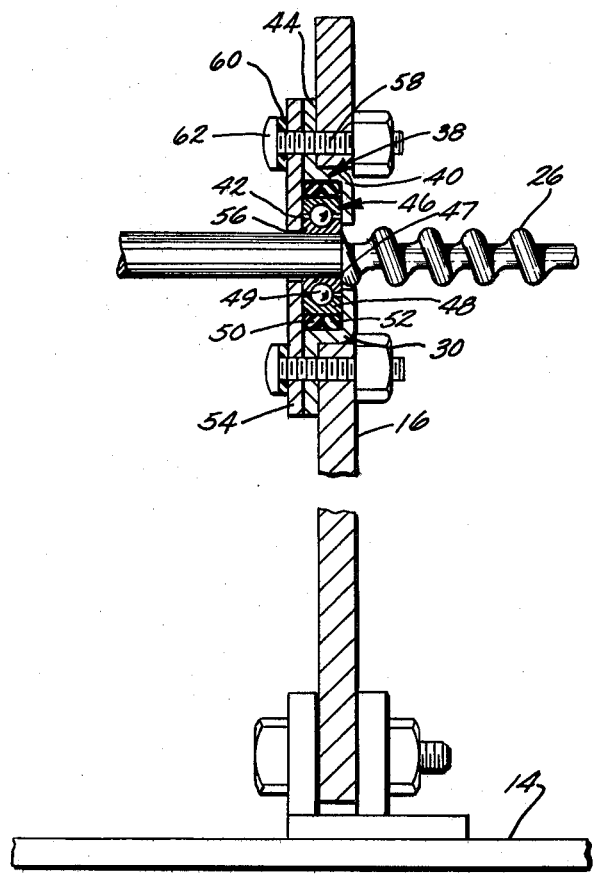
FIG. 2 is a cross-section taken through the plane II—II of FIG. 1.

In accordance with this invention, the end shaft mounts 28 are provided in order to accommodate irregularities in the trueness of the lead screw 26 due to typical manufacturing tolerance variations, as well as various shaft eccentricities or deflections resulting from such things as thermal expansion, torsional stresses, and compression and tension stresses imposed on the screw shaft during the printer operation. As best seen in FIG. 2, end shaft mounts 28 include a bearing housing 38, having a laterally protruding hub portion 40 defining a bearing chamber 42 and an integral annular skirt forming a mounting flange 44. The hub portion 40 is disposed within the aperture 30 formed in the upstanding end 16 of the support 12. A bearing 46 including an inner race 47, and outer race 48 and roller elements, or balls, 49 is disposed on each end of the screw shaft 26. The inner race may be lightly press-fitted to the end portion of screw shaft 26 (which is cylindrical and of reduced diameter) and the outer race 48 of the bearing is supported within the bearing chamber 42 by resilient annular elements 50 and 52, which preferably are O-rings of rubber or the like. A flat cover plate 54 having a centrally disposed opening 56 is secured to the mounting flange 44 of the bearing housing 38. The cover plate functions to retain the bearing 46 within the bearing chamber 42 by overlying the outer race 48, as well as to initially pre-load (i.e., slightly deform) the O-rings 50 and 52 from a lateral direction. This initial deformation of the O-rings serves to force the latter against one another and against the walls of the bearing chamber, and thus to more nearly fill the annular space around the bearing, while also placing the O-rings under resilient compression. This provides a flexible mount for each end of the screw shaft 26 that is more responsive to screw shaft motion and also provides better damping characteristics. The O-rings may be formed from any suitably resilient compound, preferably a rubber type composition.

The end shaft mounts 28, including both the bearing housing 38 and cover plate 54 is secured to the upstanding support ends 16 and 18 by a plurality of spaced fasteners 58 e.g., bolts. Further, at least one such mount has a grommet 60 formed of a resilient compound, preferably of a rubber type, disposed on each fastener 58 between the head 62 of the fastener and the cover plate 54. By securing the end shaft mounts 28 to the support 12 in this manner, lateral motion of the end shaft mounts 28 is permitted, thereby accommodating longitudinal shifting and/or thermal expansion of the screw shaft 26. More particularly, it may be noted that the lead screw is stepped down at the end of its worm thread to form an annular shoulder 27 which lies directly adjacent, one end of the inner bearing race 47, the other end of which is exposed by the opening 56 in cover plate 54. The cover plate overlies the outer race 48 of the bearing, however; thus, axial shifting or expansion of the lead screw will result in shoulder 27 applying lateral force, or thrust, to bearing 46, via its inner race. This loading in turn is transmitted through the bearing to cover plate 54, thus forcing the latter outward and resiliently compressing the grommets 60 against the heads 62 of fastener bolts 58. While each end of the lead screw may include such resilient grommet mounting, it may be desired to so mount only one end, while "hard-mounting" or fixedly positioning the other in a desired manner, as by shimming the end of the shaft. By so doing, one end will always be held in referenced position while shaft end movement resulting from axial distension or creep will take place at only the other end.

The structural arrangement of the subject invention, therefore, provides a mount for the lead screw, and thus for the carriage 24, which ensures smooth and proper carriage movement while preventing binding or sticking of the screw shaft 26. The end shaft mounts 28 act to continously compensate for random variations in lack of lead screw trueness, accommodating all manner of deviations and deflections of the screw shaft 26 during operation of the printer, including deflections due to thermal expansion. The end shaft mounts 28 are simple in structure, providing ease of manufacture, ease of assembly and overall increased reliability of the printer incorporating the subject invention.

It is expressly intended that the foregoing description is illustrative of the preferred embodiment only and is not to be considered limiting. The true spirit and scope of the invention will be determined by reference to the appended claims.

The embodiments of the invention in which an exclusive property or privilege is claimed are defined as follows:

1. In a printer of the type having a carriage-supported print head moved by a screw shaft drive system, the carriage being slidably mounted on at least one guide rod extending between a pair of spaced wall portions of a support apparatus and also including means operably connected to the screw shaft so that the carriage will be longitudinally translated along the screw shaft upon rotation thereof, the improvement comprising; in combination: an elongated drive screw comprising said screw shaft, and a resilient, flexible shaft mount for rotatably supporting at least one end of said screw shaft upon the spaced wall portion of said support apparatus at such end; said shaft mount including a bearing housing having a bearing chamber; a bearing disposed on said screw shaft and within said bearing chamber and said ring, said ring flexibly and movably supporting the bearing within said chamber.

2. The improvement as defined by claim 1, further including a cover plate and means for securing the latter to said bearing housing such that the cover plate contacts and initially deforms said ring about said bearing.

3. The improvement as defined by claim 1 wherein said bearing housing includes a mounting flange portion having a plurality of apertures formed therein, a cover plate having a plurality of apertures formed therein in registration with the apertures in the mounting flange, and a fastener device passing through said registering apertures to attach said shaft mount to said spaced wall portions.

4. The improvement defined by claim 3 further including a plurality of resilient grommets, at least one of said grommets being disposed on different ones of the fasteners so as to permit longitudinal movement of the bearing mount relative to said wall portions thereby accomodating lenthwise shifting of the shaft.

5. A printer of the type defined by claim 1 further including a second resilient ring, and ring disposed within said bearing chamber and also flexibly supporting said bearing.

6. A yieldable, flexible suspension for a rotary driving shaft, comprising: an elongated rotary drive shaft freely and openly extending between a pair of separate and mutually independent spaced points along its length; means for independently supporting said drive shaft at its said spaced points, including a pair of fixed supports each carrying a bearing housing at said pair of separate spaced points along the length of said shaft, said bearing housings each having a bearing chamber; a bearing supporting said shaft within each of said bearing chambers at said independent spaced points, said bearings being mutually independently supported at their respective separate locations; and at least one flexible member yieldably supporting the shaft and bearing at least a selected one of said spaced points, whereby such bearing and the portion of the shaft supported thereby may move independently in response to shaft distortion by flexure of said flexible member supporting said bearing and without transmitting such distortion movement to the other bearing or other support portion of the shaft through structure extraneous to the shaft.

7. A yieldable, flexible shaft suspension as defined by claim 6, including a pair of said flexible members disposed side-by-side at said selected one of said spaced points, both such members supporting the bearing at such point.

8. A yieldable, flexible shaft suspension as defined by claim 6, further including a cover member for at least certain of said bearing housings for applying an initial loading to the yieldable member at such housing and for retaining the bearing within the bearing chamber of that housing.

9. A yieldable, flexible shaft suspension as defined by claim 8, wherein said cover member has a plurality of post-like members extending laterally thereof, said members comprising fasteners for attaching the cover member to a support.

10. A yieldable, flexible shaft suspension as defined by claim 9 further including at least one resilient member disposed adjacent said cover member to permit lateral movement of the bearing accommodating longitudinal movement or extension of the rotary driving shaft.

11. A yieldable, flexible shaft suspension as defined by claim 10, wherein said resilient member includes a resilient grommet, said grommet being disposed on the post-like fastener so as to permit lateral movement of the bearing relative to the support, thereby accommmodating elongation or extension of the shaft.

12. A yieldable, flexible suspension for a rotary driving shaft, comprising: a mutually spaced pair of bearings encircling an elongated drive shaft at spaced points along its length; a pair of mutually independent bearing housings, each at least partially encompassing and capturing one of said bearings while on said shaft to independently hold the bearings relative to the shaft; a pair of rigidly fixed support walls separately supporting said housings and bearings; and resiliently yieldable means acting between at least one of said bearing or the bearing housing therefor at a given one of said spaced points along the length of said shaft and the fixed wall supporting the housing and bearing at such point to permit lateral shifting of said one bearing or housing relative to said one fixed wall by resilient yielding of said means, to thereby compensate for and allow lengthwise shifting of said shaft.

13. The apparatus of claim 12, wherein said shaft has a radially enlarged shoulder disposed laterally adjacent one side of said bearing at said given point to apply lateral force to said bearing upon axial shifting of the shaft, said resiliently yieldable means being positioned to absorb said lateral force applied to said bearing.

14. The apparatus of claim 13, including mechanical fastener means attached to said support walls and holding said yieldable means in position.

15. The apparatus of claim 14, wherein said fasteners comprise elongated members and said yieldable means comprise grommets encircling such members.

* * * * *